Dec. 26, 1961 H. H. NUSSBAUM 3,014,574
ARTICLE HANDLING APPARATUS
Filed April 2, 1958 2 Sheets-Sheet 1
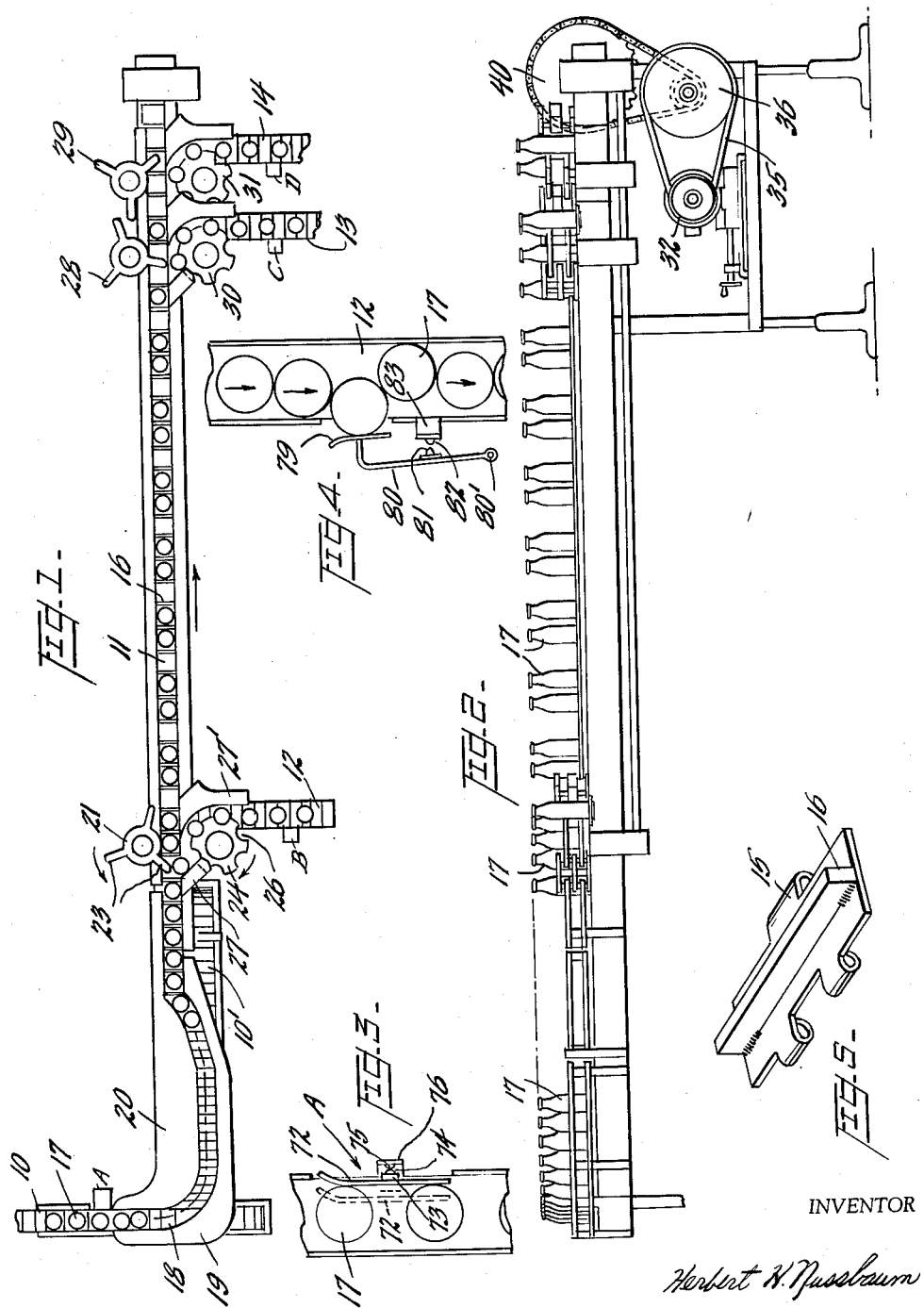
INVENTOR
Herbert H. Nussbaum
BY
Watson, Cole, Grindle & Watson
ATTORNEYS

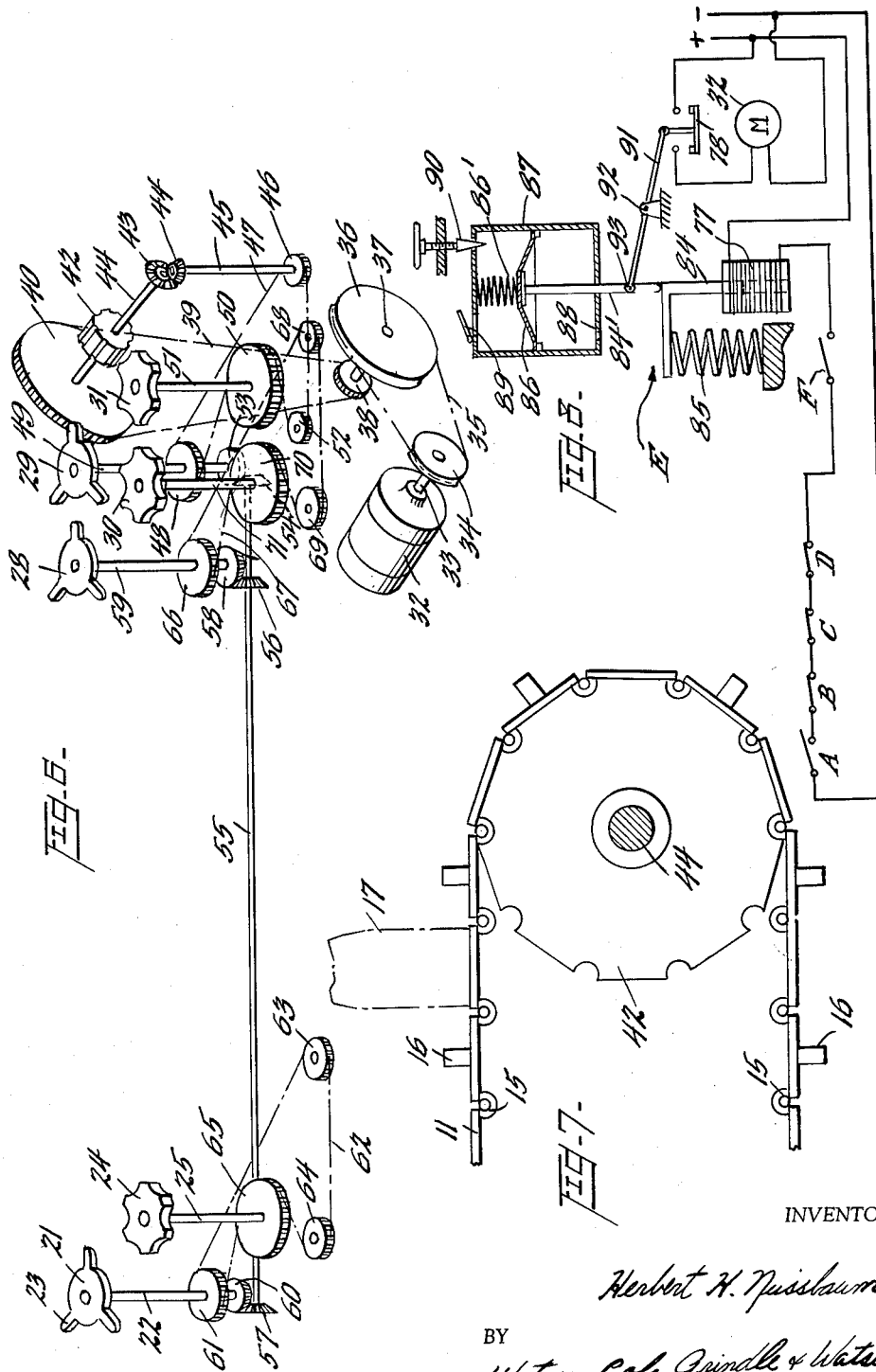

8,014,574
Patented Dec. 26, 1961

3,014,574
ARTICLE HANDLING APPARATUS
Herbert H. Nussbaum, Bainbridge, Ga., assignor to Miller Hydro Company, Bainbridge, Ga., a corporation of Georgia
Filed Apr. 2, 1958, Ser. No. 725,819
3 Claims. (Cl. 198—81)

This invention relates to article handling apparatus and more particularly to apparatus for use primarily in bottling plants and the like.

In establishments for bottling soft drinks and other beverages in which bottles are re-used after washing and sterilizing, the capacities of the several automatic machines are frequently of substantially different values. For example, the capacity of the washing and sterilizing apparatus may be, and usually is, several times as great as the capacity of a filling apparatus. Thus, it is necessary to divide the output of the washing and sterilizing apparatus into several parts, dispatching each part to a different filling apparatus. Various means, of greater or lesser efficiency, are now utilized for this purpose.

It is the general object of the present invention to provide automatic apparatus for dividing an incoming stream of articles, for example bottles coming from a washing and sterilizing apparatus, into a plurality of outgoing streams. For example, streams of bottles fed to several individual filling machines in a bottling plant. It will be obvious, however, that the utility of the apparatus of the present invention will not be limited to bottling plants specifically.

More precisely, it is an object of the invention to provide apparatus for dividing an incoming stream of articles into a plurality of outgoing streams thereof, comprising a positioning conveyor, means for supplying a stream of articles to the positioning conveyor, a plurality of out-feed conveyors extending away from positions adjacent the positioning conveyor, means for transferring articles from said positioning conveyor to each of the out-feed conveyors, each said transfer means acting to transfer a spaced succession of articles to its associated out-feed conveyor, and means for driving the positioning conveyor and the several transfer means in timed relation.

A further object is the provision, in an apparatus of the type described above, of a positioning conveyor having upstanding transverse partitions dividing it into a plurality of article-receiving compartments, each of the aforesaid transfer means including a starwheel positioned adjacent the positioning conveyor and rotating so that the radial arms of the starwheel intermesh with a spaced succession of the compartments of the positioning conveyor.

Another object is the provision, in an apparatus of the type described, of a take-off wheel opposite each starwheel, for receiving an article which is pushed off of the positioning conveyor and transferring the said article to an outfeed conveyor at the velocity of travel of the latter.

Another object is the provision, in an apparatus of the type described, of means for driving the aforesaid cooperating mechanisms in timed relation and including a power source, an electric motor, and a circuit including the power source, motor, and switches for automatically starting the apparatus when a supply of articles is available for distribution, and for automatically stopping it when such supply is exhausted or when any of the out-feed conveyors becomes blocked as, for example, by the shut-down of an apparatus which it is feeding.

Other and further objects, features and advantages will be apparent from the description which follows, read in connection with the accompanying drawings in which FIGURE 1 is a diagrammatic plan view of an apparatus according to the invention;

FIGURE 2 is a side elevation of the apparatus of FIGURE 1;

FIGURE 3 is a fragmentary plan view showing the location and operation of the automatic starting switch;

FIGURE 4 is a fragmentary plan view showing the location and operation of one of the automatic stop switches;

FIGURE 5 is a detailed perspective showing a single element of the distributing conveyor chain;

FIGURE 6 is a schematic view of the drive mechanism;

FIGURE 7 is a fragmentary vertical sectional view of the drive mechanism showing the main sprocket wheel; and FIGURE 8 is a schematic wiring diagram illustrating a pneumatic delay device in the motor circuit.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to FIGURES 1 and 2, the apparatus comprises generally an in-feed conveyor 10, a positioning conveyor 11 and a plurality of out-feed conveyors 12, 13 and 14. These conveyors, other than the positioning conveyor 11, may be of any suitable type, and in the present embodiment are shown as comprising sprocket-driven chains. The positioning conveyor 11, consists of a sprocket-driven chain, every other element 15 of which (FIGURE 5) is provided with an upstanding lug or projection 16. The spaces between adjacent lugs 16 form compartments for receiving single articles, thus spacing them properly for distribution by the several transfer means to be described, and preventing rubbing of the several articles against each other. In the handling of bottles, particularly, it is desirable, wherever possible, to prevent frictional contact between the bottles in order to avoid abrasion and disfigurement of the bottles, and the lugs 16 of the positioning conveyor serve this function as well as the function of spacing the bottles or other articles suitably for operation of the transfer means.

The in-feed conveyor 10 is adapted to bring a succession of articles 17 into a path 18 defined between guides 19 and 20 which may be formed of sheet metal or other suitable material, the articles being advanced along the path 18 by the conveyor 10 until a point is reached at which the articles leave the conveyor 10 and are guided onto a supplementary conveyor 10' travelling at right angles to the conveyor 10. Of course, the direction of the primary in-feed conveyor 10 will depend upon the location of the various machines in a particular plant, and orientation as illustrated in FIGURE 1 is exemplary only; but the supplementary in-feed conveyor 10' of the present embodiment, or the final reach of the in-feed conveyor system, in any case, must travel parallel and closely adjacent to the positioning conveyor 11, in order that the path 18 may gradually approach the positioning conveyor as shown. As the articles pass along the path 18 they are urged, by the guide member 19, onto the positioning conveyor on which each article occupies a separate compartment between adjacent lugs 16.

Each out-feed conveyor 12, 13, 14, extends away from a position adjacent the positioning conveyor, its direction of travel being, of course, away from the latter. A starwheel 21 is secured upon a vertical shaft 22 (FIGURE 6) adjacent the positioning conveyor at a point slightly in advance of the out-feed conveyor 12 and on the opposite side of the positioning conveyor. In the embodiment illustrated, the starwheel 21 is provided with three radial arms 23 each of which is adapted to extend into and substantially through every third compartment of the positioning conveyor as these mechanisms move in the respective directions shown by arrows in FIGURE 1. Opposite the starwheel 21 and closely adjacent the out-feed conveyor 12 a take-off wheel 24 is fixed upon a vertical shaft 25 (FIGURE 6), the take-off wheel being provided with a plurality of coves 26 each of which is adapted to receive an article 17 as the latter is pushed from the positioning conveyor 11. Stationary guides 27 and 27' facilitate transfer of the articles from the conveyor 11 into the respective coves of the take-off wheel 24 and thence onto the conveyor 12, the wheel 24 rotating in the direction indicated by the appropriate arrow in FIGURE 1 and at a speed such that the articles 17 are received on the out-feed conveyor 12 at substantially the velocity of travel of the latter.

After passing the out-feed conveyor 12, the positioning conveyor 11, with every third compartment empty, travels to and past the out-feed conveyors 13 and 14, each of which is similar to the out-feed conveyor 12. Starwheels 28, 29 and take-off wheels 30, 31 serve the out-feed conveyors 13 and 14 in the manner already described in connection with out-feed conveyor 12, each of said starwheels being adapted to remove from the positioning conveyor 11 one of each group of two articles 17 remaining thereon when the conveyor 11 passes beyond out-feed conveyor 12. In the present embodiment the out-feed conveyors 13 and 14 are shown closely adjacent each other but they may, of course, be spaced as desired.

Referring now to FIGURE 6, it will be seen that the drive mechanism for the apparatus described above comprises an electric motor 32 on the shaft 33 of which is fixed a pulley 34 driving a belt 35. The latter in turn drives a pulley 36 fixed on shaft 37, on which is also fixed a sprocket pinion 38. The latter is connected by means of a sprocket chain 39 with a sprocket 40 fixed on shaft 41 on which is also fixed the drive sprocket 42 for the positioning conveyor chain 11, and a bevel gear 43. The latter meshes with bevel gear 44 fixed on vertical shaft 45 at the lower end of which is secured a sprocket 46. The latter drives a chain 47 which passes around a sprocket 48 on shaft 49 carrying the starwheel 29, sprocket 50 on shaft 51 carrying the take-off wheel 31 and idler sprocket 52. A bevel gear 53 fixed on the lower end of shaft 49 meshes with bevel gear 54 on horizontal shaft 55 which also carries bevel gears 56 and 57. Bevel gear 56 meshes with bevel gear 58 on vertical shaft 59 which carries the starwheel 28, while bevel gear 57 meshes with a bevel gear 60 on vertical shaft 22 carrying starwheel 21. Shaft 22 also carries sprocket 61 which drives chain 62 passing over idler sprockets 63 and 64 and a sprocket 65 fixed on shaft 25 which carries take-off wheel 24.

Returning now to vertical shaft 59 it will be seen that a sprocket 66 fixed thereon drives chain 67 which passes over idler sprockets 68 and 69 and a sprocket 70 fixed on the lower end of shaft 71 which carries take-off wheel 30.

The drive mechanism just described thus provides for movement, in properly timed relation, of the positioning conveyor 11, starwheels 21, 28 and 29 and take-off wheels 24, 30 and 31. Separate drive means, of conventional character, are provided for in-feed conveyor 10, supplemental conveyor 10' and out-feed conveyors 12, 13 and 14.

The distributing conveyor and its associated transfer means are intended to operate only during such time as an adequate supply of articles 17 is made available by the in-feed conveyor 10, so that all compartments of the positioning conveyor will be occupied. To this end, a start switch A (FIGURE 1) is provided in association with the in-feed conveyor 10, such switch being seen in greater detail in FIGURE 3. The switch A comprises a shoe 72 supported on a resilient member 73 which also carries a contact 74. An opposed contact 75 is mounted on a fixed bracket 76, the entire switch assembly being positioned, relative to the conveyor 10, so that the shoe 72 overlies the conveyor in the path of bottles or other articles being transported thereon. From the foregoing description it will be seen that the switch A is normally open; that is, when the shoe 72 is not impinged by articles moving on the conveyor, it will occupy the position shown in broken lines in FIGURE 3 and the contact members 74 and 75 will be disengaged, breaking the circuit through the switch.

Referring now to FIGURE 8, it will be seen that normally open switch A is in series with the coil 77 of a pneumatic delay device E which operates a switch 78 in the circuit of the motor 32, the operation of the device E being described below. A manually operated master switch F is also in series with the coil 77, as are normally closed stop switches B, C and D associated with the respective out-feed conveyors 12, 13 and 14. One of these stop switches is seen in more detail in FIGURE 4.

In the event that an operation or a machine fed by one of the out-feed conveyors 12, 13, 14 is stopped because of machine failure or for any reason, it is of course necessary to stop the entire article distributing operation including the positioning conveyor 11 and its associated mechanisms. The stop switches B, C and D are adapted to accomplish this result automatically. The switch B, for example, seen in FIGURE 4, comprises a shoe 79 carried by a pivoted arm 80 which also carries a contact member 81. An opposing contact 82 is carried by a fixed bracket 83, and the arm 80 is normally urged, by resilient means 80', in a direction to engage the contacts 81 and 82; in other words, switch B is normally closed and in this position the shoe 79 occupied a position substantially flush with one edge of the conveyor 12. When a succession of articles 17 "back up" on the conveyor 12, due to cessation of the operation or machine which is being fed by that conveyor the switch B will be opened as shown in FIGURE 4, thus stopping the motor 32. The switches C and D operate in the same manner and are located relative to conveyors 13 and 14 as just described with respect to switch B and conveyor 12. The conveyors 12, 13 and 14 are, of course, provided with upstanding walls or guides at either side so that when the articles 17 are crowded together, as seen in FIGURE 4, they do not move laterally off the conveyor. The shoe 79 of each stop switch registers with an opening in the adjacent wall of the associated conveyor, and is normally substantially flush therewith.

The pneumatic delay device E is provided in order to delay the starting of the motor 32, after any stoppage, for a sufficient time after the switch A is closed to allow a continuous supply of articles 17 to be accumulated in the path 18. The delay device operates as follows. When the coil 77 is energized the L-shaped core 84 is moved downwardly, compressing spring 85. The separate plunger 84' is attached to a diaphragm 86 which is sealed to the sides of a chamber 87 and is biased downwardly by a spring 86'. The lower portion of the chamber 87 is vented at 88 while the upper portion of the chamber 87 is provided with a flap valve 89 and a needle valve 90. When the core 84 moves downwardly spring 86' urges the diaphragm 86 and plunger 84' downwardly at a rate of movement depending upon the rate at which air enters the chamber 87 at the needle valve 90, the flap valve 89 being closed under these conditions. When, on the other hand, the core 84 is moved upwardly by spring 85 upon deenergization of the coil 77, the flap valve 89 opens and the movement of plunger 84' is instantaneous. The switch 78 is secured to one end of a lever 91 having a fixed fulcrum 92, the other end of lever 91 being secured to the plunger 84' as at 93. Thus, down movement of the plunger 84' closes the switch 78 in a delayed manner, as described, while upward movement of the plunger 84' instantaneously opens the switch 78 and stops the motor 32.

Having thus described the invention, what is claimed as new and desired to be secured by Letters Patent is:

1. Apparatus for dividing an incoming stream of articles into a plurality of outgoing streams thereof comprising, in combination, a positioning conveyor, said positioning conveyor having a horizontal article-supporting surface provided with upstanding transverse partitions dividing it into a plurality of article-receiving compartments, means for supplying a succession of individual articles to successive compartments of said positioning conveyor, a plurality of out-feed conveyors arranged in pairs extending away from positions adjacent said positioning conveyor, separate means for transferring individual articles from said positioning conveyor to each of said out-feed conveyors, and means for driving said positioning conveyor and said transfer means in timed relation, each said transfer means acting to transfer a spaced succession of articles from said positioning conveyor to one of said out-feed conveyors, each said transfer means including a starwheel disposed laterally of said positioning conveyor and rotating at an angular speed proportional to the linear speed of said positioning conveyor, said starwheel having radial arms intermeshing with a spaced succession of said compartments.

2. Apparatus as defined in claim 1, including a take-off wheel opposite each said starwheel on the other side of said positioning conveyor, said take-off wheel rotating at an angular speed proportional to the angular speed of the associated starwheel.

3. Apparatus for dividing an incoming stream of articles into a plurality of outgoing streams thereof comprising, in combination, a positioning conveyor, said positioning conveyor having a driven horizontal article-supporting surface provided with upstanding transverse partitions carried by said surface and dividing said positioning conveyor into a plurality of article-receiving compartments, means for supplying a succession of individual articles to successive compartments of said positioning conveyor, a plurality of out-feed conveyors arranged in pairs extending away from positions adjacent said positioning conveyor, separate rotary transfer means disposed laterally of said positioning conveyor for transferring individual articles from said positioning conveyor to each of said out-feed conveyors, each of said rotary transfer means having laterally disposed radial projections fixed thereto and rotating therewith and each intermeshing with a spaced succession of said compartments, and means for driving said positioning conveyor and said transfer means in timed relation, each said transfer means acting to transfer a spaced succession of articles from said positioning conveyor to one of said out-feed conveyors.

References Cited in the file of this patent

UNITED STATES PATENTS

| | | |
|---|---|---|
| 1,118,425 | Johnson | Nov. 24, 1914 |
| 1,140,807 | Englar | May 25, 1915 |
| 2,037,931 | Schmidt | Apr. 21, 1936 |
| 2,085,410 | Bergmann | June 29, 1937 |
| 2,215,702 | Holm | Sept. 24, 1940 |
| 2,503,864 | Carter | Apr. 11, 1950 |
| 2,558,751 | Hebert | July 3, 1951 |
| 2,609,947 | Couchman | Sept. 8, 1952 |
| 2,743,001 | Nordquist | Apr. 24, 1956 |
| 2,756,553 | Ferguson et al | July 31, 1956 |

FOREIGN PATENTS

| | | |
|---|---|---|
| 603,939 | Germany | Oct. 12, 1934 |